US012572763B2

(12) United States Patent
Vallinayagam et al.

(10) Patent No.: US 12,572,763 B2
(45) Date of Patent: Mar. 10, 2026

(54) METHOD AND APPARATUS FOR CONFIGURING RFID PRINTERS WITH RFID LABEL MEDIA

(71) Applicant: Hand Held Products, Inc., Charlotte, NC (US)

(72) Inventors: Muthu Kumar Vallinayagam, Charlotte, NC (US); Pankaj Kumar Pandey, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 61 days.

(21) Appl. No.: 18/768,707

(22) Filed: Jul. 10, 2024

(65) Prior Publication Data

US 2025/0036891 A1 Jan. 30, 2025

(30) Foreign Application Priority Data

Jul. 27, 2023 (IN) .............................. 202311050680

(51) Int. Cl.
*G06K 7/10* (2006.01)
*H04B 17/21* (2015.01)
*H04B 17/318* (2015.01)

(52) U.S. Cl.
CPC ......... *G06K 7/10198* (2013.01); *H04B 17/21* (2015.01); *H04B 17/318* (2015.01)

(58) Field of Classification Search
CPC ........... G06K 7/10198; G06K 17/0022; G06K 17/00; G06K 15/02; G06K 15/026;
(Continued)

(56) References Cited

U.S. PATENT DOCUMENTS 7,600,685 B2 * 10/2009 Alleshouse ............ G06K 1/121
235/462.15
7,880,590 B2 * 2/2011 Jam ......................... G01S 13/75
704/8
(Continued)

OTHER PUBLICATIONS

Extended European Search Report Mailed on Dec. 17, 2024 for EP Application No. 24183122, 6 page(s).
(Continued)

*Primary Examiner* — Curtis J King
(74) *Attorney, Agent, or Firm* — Alston & Bird LLP

(57) ABSTRACT

A method and system are directed to calibrating a radio frequency identification (RFID) printer, the method comprising retrieving frequency hopping capability from an RFID module coupled to the RFID printer, performing a plurality of calibration read and write operations to the calibration RFID label at a plurality of given positions using the RFID module based on a plurality of combinations comprising one or more field strengths, one or more sets of EPCC1G2 standard-based RFID parameters, and the frequency hopping capability, determining best one or more of a plurality of results associated with the plurality of calibration read and write operations, determining a tag antenna orientation of the calibration RFID label based on the plurality of results, and storing one or more optimal configuration settings in printer firmware of the RFID printer based on the tag orientation and the best one or more of the plurality of results.

20 Claims, 6 Drawing Sheets

(58) Field of Classification Search

CPC .... G06K 15/025; G06K 15/027; G06K 15/18; H04B 17/21; H04B 17/318; G06F 3/1203

See application file for complete search history.

(56) References Cited

U.S. PATENT DOCUMENTS

| | | | | |
|---|---|---|---|---|
| 10,853,715 | B2 * | 12/2020 | Tsuchimoto ....... | G06K 19/0723 |
| 11,827,042 | B2 * | 11/2023 | Kawasaki ............ | G01S 5/0295 |
| 12,108,000 | B1 * | 10/2024 | d'Armancourt ... | H04N 1/00342 |
| 2005/0274800 | A1 * | 12/2005 | Chapman ............... | G06K 17/00 |
| | | | | 235/432 |
| 2005/0275880 | A1 * | 12/2005 | Korst ................. | G06K 15/1822 |
| | | | | 358/1.15 |
| 2007/0023516 | A1 * | 2/2007 | Chapman ............... | G06K 17/00 |
| | | | | 235/432 |
| 2007/0188328 | A1 | 8/2007 | Mochizuki et al. | |
| 2007/0290802 | A1 | 12/2007 | Batra et al. | |
| 2009/0189770 | A1 * | 7/2009 | Wirrig ................. | G06K 7/0008 |
| | | | | 340/572.8 |
| 2013/0169996 | A1 * | 7/2013 | McLeod ............. | G06F 11/0733 |
| | | | | 358/3.28 |
| 2014/0035733 | A1 * | 2/2014 | Yamamoto ............... | G06K 1/20 |
| | | | | 340/10.51 |
| 2014/0035734 | A1 | 2/2014 | Yamamoto | |
| 2015/0199594 | A1 * | 7/2015 | Kuniya .............. | G06K 17/0025 |
| | | | | 358/1.5 |
| 2019/0005422 | A1 * | 1/2019 | Lee .................... | G06Q 10/0633 |
| 2019/0385039 | A1 * | 12/2019 | Dyche ............. | G06K 19/07786 |
| 2022/0176714 | A1 | 6/2022 | Kawasaki | |

OTHER PUBLICATIONS

Intention to grant Mailed on Nov. 19, 2025 for EP Application No. 24183122, 5 page(s).

* cited by examiner

ENCASEMENT 102

FACE 104

INTEGRATED CIRCUIT 106

TAG ANTENNA 108

SUBSTRATE 110

ADHESIVE 112

RFID COUPLER 108

MEDIA GUIDE ASSEMBLY 102

MEDIA GUIDE ASSEMBLY 102

MEDIA GUIDE ASSEMBLY 102

PLATEN ROLLER 104

PRINTHEAD 106

METHOD AND APPARATUS FOR CONFIGURING RFID PRINTERS WITH RFID LABEL MEDIA

CROSS-REFERENCE TO RELATED APPLICATIONS

This application claims priority pursuant to 35 U.S.C. 119 (a) to Indian application No. 202311050680, filed Jul. 27, 2023, which application is incorporated herein by reference in its entirety.

FIELD OF THE INVENTION

Example embodiments of the present disclosure relate generally to radio frequency identification (RFID) printers, and in particular, RFID printers that can support various RFID tag antenna orientations.

BACKGROUND

Radio frequency identification (RFID) label media may be programmed or encoded by an RFID printer. To ensure that information is correctly programmed to each label of the RFID label media, the RFID printer should be configured to align an RFID label precisely with an RFID coupler of the RFID printer. Calibration procedures exist for configuring alignment of an RFID label with an RFID coupler. However, existing calibration procedures do not account for different orientations of RFID tag antennas that may exist on labels of various RFID label media sources. Improperly configuring RFID printers for specific RFID labels may lead to a hang state, unresponsiveness, or increased error susceptibility while performing the read and/or encode operations. Applicant has identified many technical challenges and difficulties associated with conventional RFID printer calibration.

BRIEF SUMMARY

Various embodiments described herein relate to components, apparatuses, and systems for determining radio frequency identification (RFID) printer label orientation and configuring RFID printers based thereof.

In accordance with various embodiments of the present disclosure, a method is provided. In some embodiments, the method comprises retrieving, by a computing device, frequency hopping capability from an RFID module coupled to the RFID printer; instructing, by the computing device, printer hardware to advance a calibration RFID label to a plurality of given positions; selecting, by the computing device, one or more first field strengths; selecting, by the computing device, one or more sets of RFID parameters; performing, by the computing device, a plurality of calibration read and write operations to the calibration RFID label at the plurality of given positions using the RFID module based on a plurality of combinations comprising the one or more field strengths, the one or more sets of RFID parameters, and the frequency hopping capability; determining, by the computing device, best one or more of a plurality of results associated with the plurality of calibration read and write operations; determining, by the computing device, a tag antenna orientation of the calibration RFID label based on the plurality of results; and storing, by the computing device, one or more optimal configuration settings in printer firmware of the RFID printer based on the tag orientation and the best one or more of the plurality of results.

In some embodiments, the RFID parameters may comprise EPCC1G2 parameters. In some embodiments, the frequency hopping capability is associated with the RFID module hopping through one or more frequencies and/or channels. In some embodiments, the frequency hopping capability is configured to comply with specific regulations of each country where used. In some embodiments, the plurality of given positions are based on at least one of a size of a printhead associated with the RFID printer or length of the calibration RFID label. In some embodiments, the one or more first field strengths comprise one or more values of antenna gain used to transmit or receive radio frequency signals by the RFID module. In some embodiments, selecting the one or more first field strengths further comprises retrieving a minimum field strength value and a maximum field strength value from the RFID module; and configuring the RFID module with a field strength within the minimum field strength value and the maximum field strength value. In some embodiments, the one or more sets of RFID parameters comprise values associated with type A reference interval (TARI), backscatter-link frequency (BLF), and Miller. In some embodiments, the one or more sets of RFID parameters comprise attributes that pertain to ISO 18000-6C UHF passive systems that adopt a EPCCIG2 (Gen2) standard. In some embodiments, determining the plurality of results associated with the plurality of calibration read and write operations; and indexing the plurality of results with the one or more field strengths and the one or more sets of RFID parameters. In some embodiments, the plurality of results comprises received signal strength indicator values. In some embodiments, the plurality of results comprises success or failure of the plurality of calibration read and write operations. In some embodiments, determining the best one or more of the plurality of results further comprises determining one or more of the plurality of given positions that exhibit successful calibration read and write operations with a most amount of the one or more field strengths and the one or more sets of RFID parameters. In some embodiments, determining the best one or more of the plurality of results further comprises determining that the plurality of given positions are associated with RSSI values that meet a threshold.

According to another embodiment, a computing apparatus is provided. In some embodiments, the computing apparatus comprises memory and one or more processors communicatively coupled to the memory, the one or more processors configured to retrieve frequency hopping capability from a radio frequency identification (RFID) module coupled to an RFID printer; instruct printer hardware to advance a calibration RFID label to a plurality of given positions; select one or more first field strengths; select one or more sets of RFID parameters; perform a plurality of calibration read and write operations to the calibration RFID label at the plurality of given positions using the RFID module based on a plurality of combinations comprising the one or more field strengths, the one or more sets of RFID parameters, and the frequency hopping capability; determine best one or more of a plurality of results associated with the plurality of calibration read and write operations; determine a tag antenna orientation of the calibration RFID label based on the plurality of results; and store one or more optimal configuration settings in printer firmware of the RFID printer based on the tag orientation and the best one or more of the plurality of results.

In some embodiments, the one or more processors are further configured to retrieve a minimum field strength value and a maximum field strength value from the RFID module;

and configure the RFID module with a field strength within the minimum field strength value and the maximum field strength value. In some embodiments, the one or more sets of RFID parameters comprise values associated with type A reference interval (TARI), backscatter-link frequency (BLF), and Miller. In some embodiments, the one or more processors are further configured to determine the plurality of results associated with the plurality of calibration read and write operations; and index the plurality of results with the one or more field strengths and the one or more sets of RFID parameters. In some embodiments, the plurality of results comprises received signal strength indicator values. In some embodiments, the plurality of results comprises success or failure of the plurality of calibration read and write operations. In some embodiments, the one or more processors are further configured to determine one or more of the plurality of given positions that exhibit successful calibration read and write operations with a most amount of the one or more field strengths and the one or more sets of RFID parameters. In some embodiments, the one or more processors are further configured to determine that the plurality of given positions are associated with RSSI values that meet a threshold.

According to another embodiment, one or more non-transitory computer-readable storage media are provided. In some embodiments, the one or more non-transitory computer-readable storage media include instructions that, when executed by one or more processors, cause the one or more processors to retrieve frequency hopping capability from a radio frequency identification (RFID) module coupled to an RFID printer; instruct printer hardware to advance a calibration RFID label to a plurality of given positions; select one or more first field strengths; select one or more sets of RFID parameters; perform a plurality of calibration read and write operations to the calibration RFID label at the plurality of given positions using the RFID module based on a plurality of combinations comprising the one or more field strengths, the one or more sets of RFID parameters, and the frequency hopping capability; determine best one or more of a plurality of results associated with the plurality of calibration read and write operations; determine a tag antenna orientation of the calibration RFID label based on the plurality of results; and store one or more optimal configuration settings in printer firmware of the RFID printer based on the tag orientation and the best one or more of the plurality of results.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION

Figure 1:
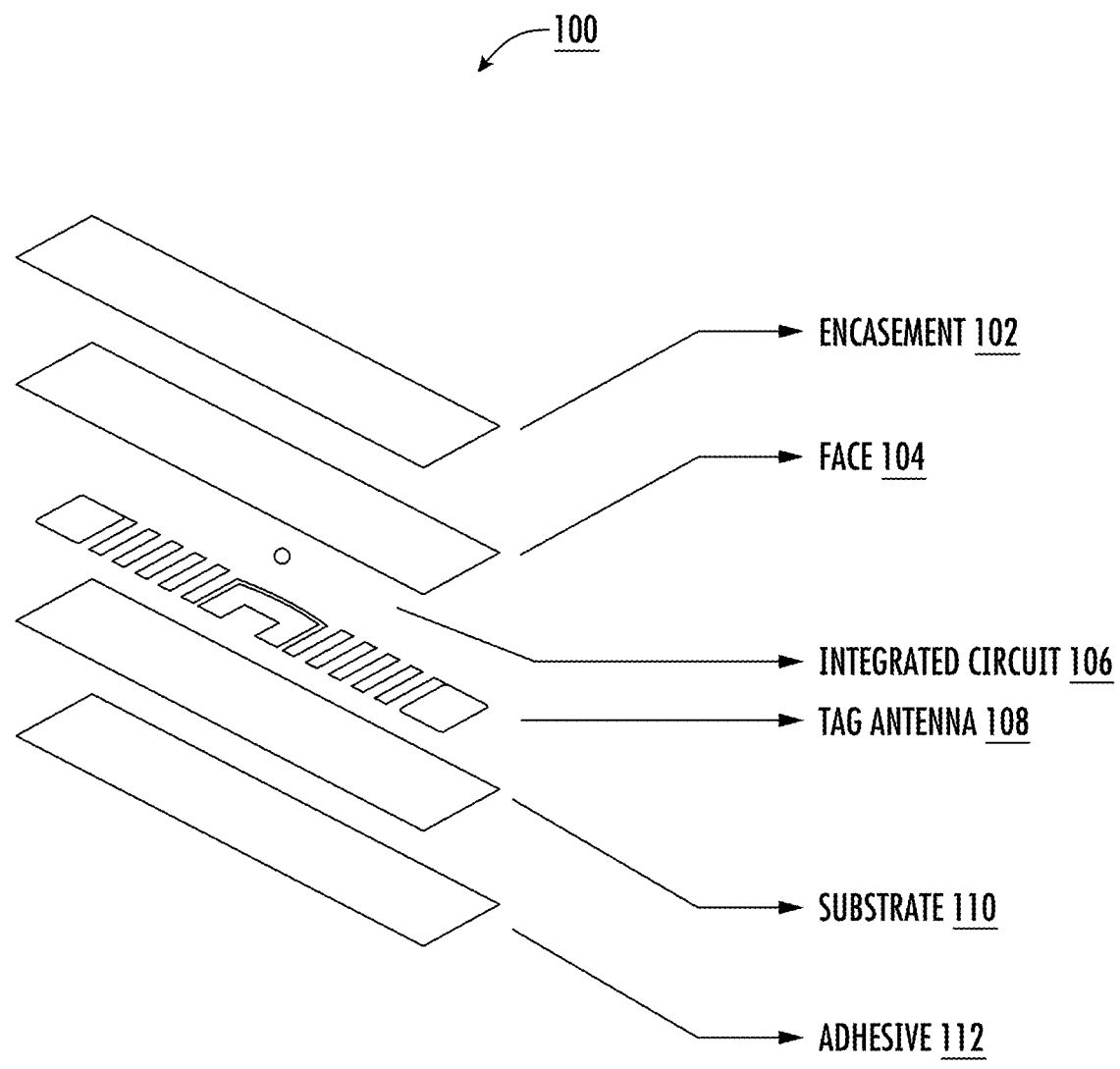
FIG. 1 illustrates an exploded view of an example radio frequency identification (RFID) inlay.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc., are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 depicts example components of a radio frequency identification (RFID) inlay that may be embedded within an RFID label. RFID inlay 100 comprises an integrated circuit 106, a tag antenna 108, and a substrate 110. The tag antenna 108 may comprise aluminum, silver, and/or copper bonded to polyethylene terephthalate (PET). The tag antenna 108 may be configured to receive radio waves from an RFID interrogator or reader (e.g., of an RFID printer) and transmit data back to the RFID interrogator or reader. The integrated circuit 106 may comprise an RFID chip configured for data storage, handling, and processing.

RFID inlay 100 further comprises encasement 102, face 104, substrate 110 and adhesive 112. As depicted in FIG. 1, the tag antenna 108 characterizes a majority of the structure of RFID inlay 100 and may define the shape and size of encasement 102, face 104, substrate 110 and adhesive 112. Substrate 110 may hold together the integrated circuit 106 and the tag antenna 108. Face 104 may comprise a thin layer of clear/white plastic or paper used to cover the integrated circuit 106 and tag antenna 108. Encasement 102 may comprise a cover that encloses the integrated circuit 106, tag antenna 108, and substrate 110. Adhesive 112 may comprise material used to attach RFID inlay 100 to an item, such as an RFID label (of RFID label media).

Manufacturers of radio frequency identification (RFID) printers often do not produce label media used with their RFID printers. As such, RFID printers may be designed to accommodate for a variety of label media variables. Label media variables may include gap or continuous labels, thermal or non-thermal labels, and RFID or non-RFID labels. An RFID printer may comprise RFID printer firmware that may be executed to calibrate printer label media settings for each type of label media used with the RFID printer. Calibrating printer label media settings may comprise detecting label media type (e.g., gap, black mark, or continuous), printing method (e.g., ribbon or no-ribbon), or label media length. If the printer label media to be calibrated comprises RFID label media, the RFID printer firmware may be further executed to calibrate RFID label media settings for the RFID label media. Calibrated printer label media settings and RFID label media settings for each different type of RFID label media may be saved to a printer profile and specific settings may be loaded from the printer profile when printing on a specific RFID label media.

Calibrating RFID label media settings may comprise determining an optimal tag position and an output power (to generate specific field strengths) for reading and/or encoding (e.g., writing) to an RFID label effectively (e.g., with a minimum reliability or data integrity). Determining an optimal tag position and output power may comprise reading from a calibration RFID label during an RFID calibration procedure. For example, an RFID calibration procedure may comprise advancing the calibration RFID label toward an RFID coupler of an RFID printer in increments while the RFID coupler attempts to read data from (and/or write data to) the calibration RFID label. The RFID coupler may comprise one or more RFID components coupled to the RFID printer to facilitate RFID reading and encoding, such as an RFID antenna, RFID chip, and/or associated circuitry. During each increment, the RFID coupler may transmit a series of read commands at various field strengths. The RFID calibration procedure may continue until the RFID coupler is able to read data from the calibration RFID label.

The RFID coupler may be able to read data from the calibration RFID label when an RFID inlay of the calibration RFID label is aligned with or positioned within a specific range of an RFID coupler of the RFID printer and the RFID coupler is transmitting at a field strength sufficient for establishing radio frequency (RF) communication between the RFID coupler and the calibration RFID label. The optimal tag position and output power may be determined based on the ability of the RFID coupler to read from the calibration RFID label at each increment and field strength. For example, the RFID calibration procedure may determine label positions where the RFID coupler can establish RF communication with the calibration RFID label at various field strengths and select label positions where the RFID coupler is able to communicate with the calibration RFID labels with a variety of field strengths or with minimum amplitudes of field strengths.

Figure 2A:
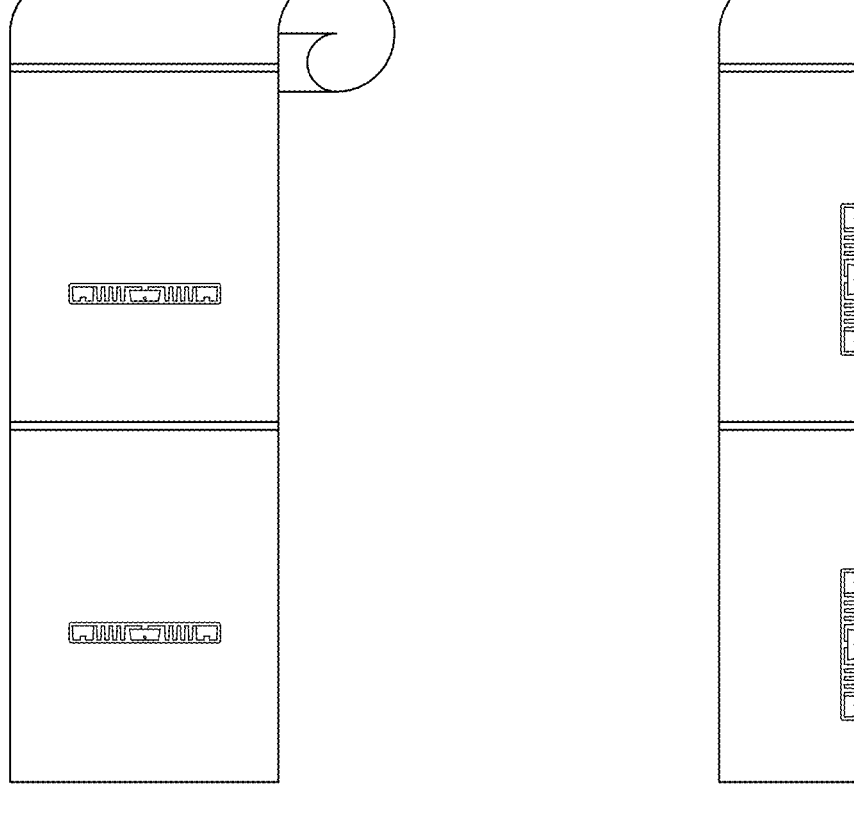
FIGS. 2A and 2B illustrate example RFID label media.
Figure 2B:
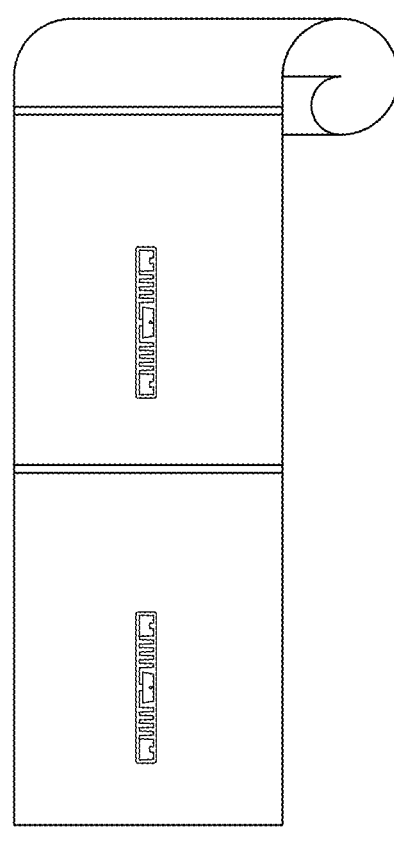

RFID label media may comprise RFID labels, where each RFID label is embedded with an RFID inlay, such as RFID inlay 100, including a tag antenna (e.g., tag antenna 108) that is either horizontally oriented (or width-wise), as depicted in FIG. 2A, or vertically oriented (or length-wise), as depicted in FIG. 2B, on the RFID label.

Figures 3A, 3B, 3C:
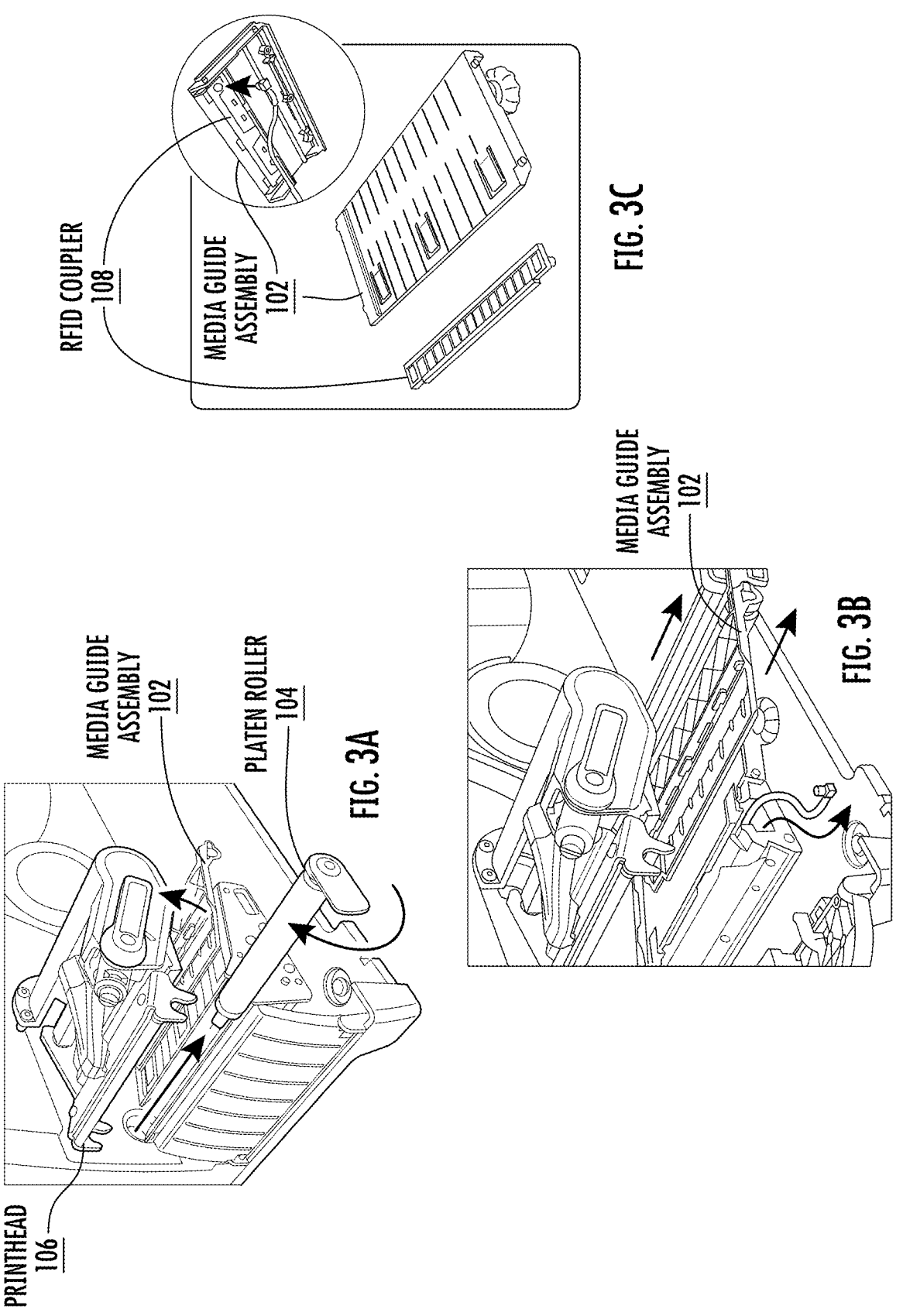
FIGS. 3A, 3B, and 3C illustrate diagrams of an example RFID printer in accordance with various embodiments of the present disclosure.

FIG. 3A through 3C depicts example components of an RFID printer. The depicted RFID printer comprises media guide assembly 102, platen roller 104, printhead 106, and RFID coupler 108. Platen roller 104 may comprise a stationary roller located under the printhead 106. RFID label media may be inserted into the RFID printer such that it may be drawn under the printhead 106 by the platen roller 104 and fed over the RFID coupler 108 by the media guide assembly 102. RFID label media may be driven though the RFID printer and under the printhead 106 by the platen roller 104. The media guide assembly 102 may comprise a feed path configured to accommodate RFID label media. For example, RFID label media may comprise a roll of blank labels including an RFID inlay embedded into each label. The printhead 106 may be configured to print on the RFID label media. In some embodiments, the printhead 106 may be configured to heat and press a thermal ribbon onto the RFID label media. In some embodiments, the printhead 106 may be configured to print directly on the RFID label media.

As depicted in FIG. 3C, the RFID coupler 108 is installed within the media guide assembly 102 across the width (horizontally) of the media guide assembly 102. In some embodiments, RFID coupler 108 comprises a short-range RFID antenna configured to read and encode RFID labels fed through the media guide assembly 102. When a tag antenna of an RFID inlay is horizontally oriented on an RFID label, the tag antenna pattern runs parallel to the orientation of RFID coupler 108, and when the tag antenna is vertically oriented on the RFID label, the tag antenna pattern runs perpendicular to the orientation of the RFID coupler 108. RFID coupler 108 may be configured to communicate with RFID labels via RF communication signals.

Due to the design nature of RFID tag antennas, communication between RFID coupler 108 and an RFID label may be best achieved when the tag antenna of the RFID label shares a same orientation as the RFID coupler 108. As such, the above-described calibration procedure may be most suitable for RFID labels comprising tag antennas that are horizontally oriented based on the position of the RFID coupler 108 also being horizontally oriented on the RFID printer. When the tag antenna of an RFID label is vertically oriented or perpendicular to the RFID coupler 108, difficulties arise during the calibration procedure. For example, a vertically oriented tag antenna of an RFID label would be tangent to the RF field signal of a horizontally oriented RFID coupler, resulting in poor or inconsistent RFID communication quality between the RFID label and the RFID coupler. An optimal tag position and output power determined using poor or inconsistent RFID communication quality may be inaccurate and unreliable.

Skew and/or orientation of tag antennas on RFID labels may vary depending on label manufacturer. However, RFID coupler placement on RFID printer is a constant as well as its orientation, e.g., in a horizontal position. As such, the orientation of a tag antenna on an RFID label in relation to the RFID coupler may be an important factor in calibrating an RFID printer for ensuring proper reading and encoding of the RFID label.

Various example embodiments of the present disclosure overcome technical challenges and difficulties in calibrating RFID printers with RFID label media, and provide various technical advancements and improvements. In accordance with various examples of the present disclosure, systems and methods for calibrating RFID printers with RFID label media comprising various tag antenna orientations are disclosed. In some embodiments, RFID printers may be calibrated by determining tag antenna orientation and configuration settings for RFID label media. Thus, embodiments of the present disclosure may help to minimize the risk of data inaccuracies and wrong configuration settings caused by existing calibration techniques.

Figure 4:
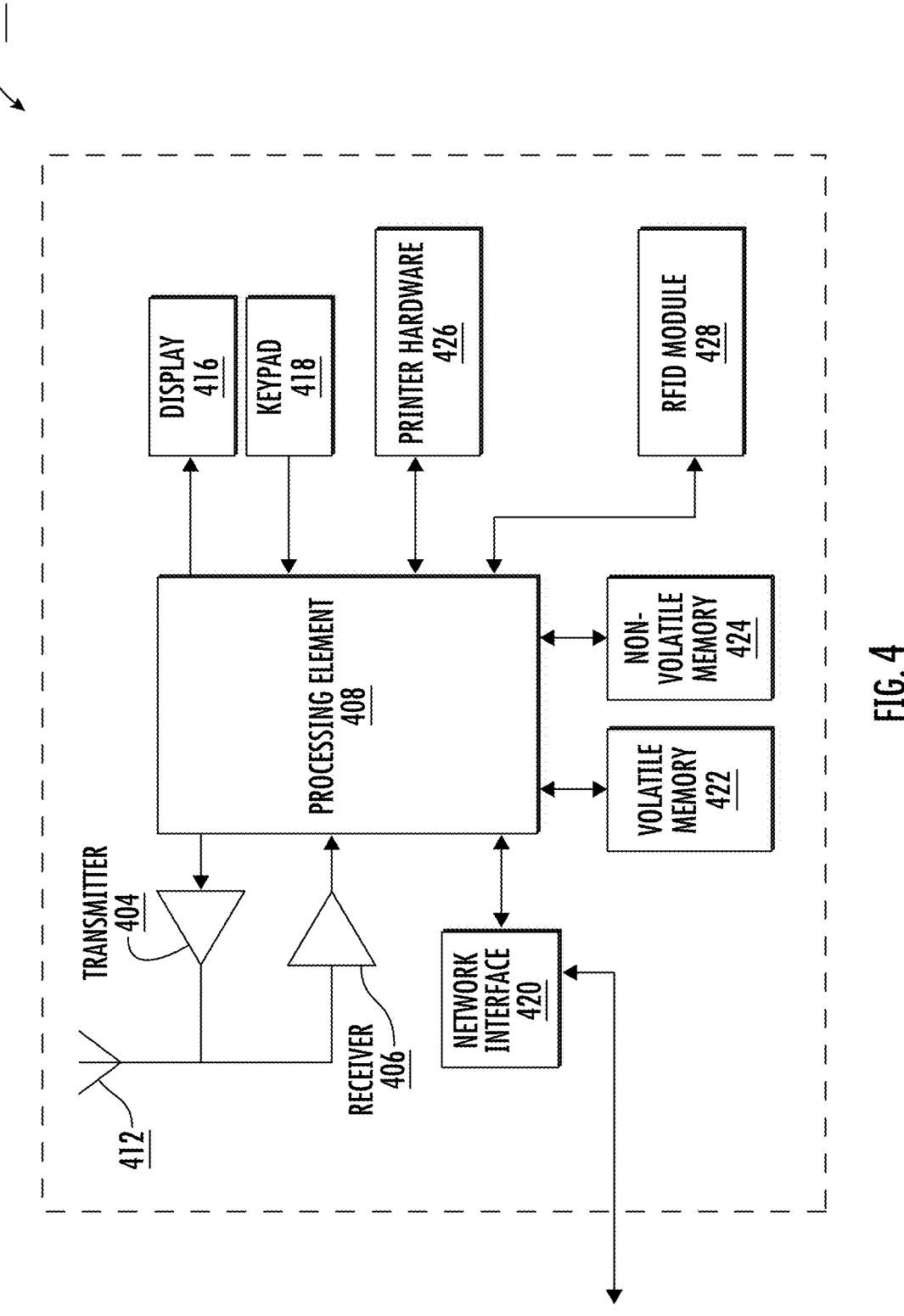
FIG. 4 illustrates an example RFID printer in accordance with various embodiments of the present disclosure.

FIG. 4 provides an illustrative schematic representative of an RFID printer 400 that can be used in conjunction with embodiments of the present disclosure. As shown in FIG. 4, the RFID printer 400 can include an antenna 412, a transmitter 404 (e.g., radio), a receiver 406 (e.g., radio), and a processing element 408 (e.g., complex programmable logic devices (CPLDs), microprocessors, multi-core processors, coprocessing entities, application-specific instruction-set processors (ASIPs), microcontrollers, and/or controllers) that provides signals to and receives signals from the transmitter 404 and receiver 406, correspondingly.

The signals provided to and received from the transmitter 404 and the receiver 406, correspondingly, may include signaling information/data in accordance with air interface standards of applicable wireless systems. In this regard, the RFID printer 400 may be capable of operating with one or more air interface standards, communication protocols, modulation types, and access types. More particularly, the RFID printer 400 may operate in accordance with any of a number of wireless communication standards and protocols. In some embodiments, the RFID printer 400 may operate in accordance with multiple wireless communication standards and protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. Similarly, the RFID printer 400 may operate in accordance with multiple wired communication standards and protocols via a network interface 420.

Via these communication standards and protocols, the client computing entity 102 can communicate with various other entities, such as a host computing entity or a central server. The RFID printer 400 can also download changes, add-ons, and updates, for instance, to its firmware, software (e.g., including executable instructions, applications, program modules), and operating system. The RFID printer 400 may also comprise a user interface (that can include a display 416 coupled to a processing element 408) and/or a user input interface (coupled to a processing element 408). For example, the user interface may be a user application, browser, user interface, and/or similar words used herein interchangeably executing on and/or accessible via the RFID printer 400 to interact with and/or cause display of information/data. The user input interface can comprise any of a number of devices or interfaces allowing the RFID printer 400 to receive data, such as a keypad 418 (hard or soft), a touch display, voice/speech or motion interfaces, or other input device. In embodiments including a keypad 418, the keypad 418 can include (or cause display of) the conventional numeric (0-9) and related keys (#, *), and other keys used for operating the RFID printer 400 and may include a full set of alphabetic keys or set of keys that may be activated to provide a full set of alphanumeric keys. In addition to providing input, the user input interface can be used, for example, to activate or deactivate certain functions.

The RFID printer 400 can also include volatile memory 422 and/or non-volatile memory 424, which can be embedded and/or may be removable. For example, the non-volatile memory 424 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 422 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the RFID printer 400. As indicated, this may include a user application that is resident on the RFID printer 400.

RFID printer 400 further comprises printer hardware 426 coupled to the processing element 408. Printer hardware 426 may comprise various components, such as a printhead, a platen roller, a media guide assembly, and associated circuitry, controllable by processing element 408 to provide label media printing functionality. A RFID module 428 is coupled to processing element 408, e.g., via a bus or other communication interface, to provide RFID reading and encoding functionality during printing of RFID labels. The RFID module 428 may comprise an RFID coupler or antenna, an RFID chip, and associated circuitry configured to perform RFID read and encode operations in conjunction with printing performed by printer hardware 426. The RFID module 428 may be configured to (i) generate an RF field in a manner such that an RFID label to be printed by the printhead may also be read and encoded to, while other RFID labels in a same roll of RFID label media as the RFID label are not read or encoded to and (ii) perform reading and encoding to the RFID label as the RFID label is moving across the antenna field of a RFID coupler of the RFID module 428.

In some embodiments, RFID module 428 may perform read operations by transmitting RF signals to elicit a response from any RFID tags within range. For example, the RFID module 428 may verify that data has been programmed to an RFID label by reading the data stored in the RFID label after the RFID module 428 has encoded data to the RFID label to verify that the data was correctly encoded to the RFID label. In some embodiments, RFID labels can be programmed with known information, such as from a host computer in communication with printer 400, and verified that the programmed information is correct. When a RFID label is programmed or encoded with data, any existing data on the RFID label may be erased and new information may be transmitted, via the RFID module 428, and encoded to the RFID label. A read operation performed with the RFID module 428 may then follow to verify that the correct information was encoded to the RFID label. In one embodiment, if a first read (verify) operation indicates an improperly programmed tag, additional encoding operations, each followed by a read (verify) operation, are performed before the RFID label is considered defective. If the RFID inlay is defective, an error notification can be given to the operator of printer 400 (e.g., shown via display 416) and printing may be halted or printer hardware 426 may print onto the defective RFID label with an indication that the RFID label is defective.

Figure 5:
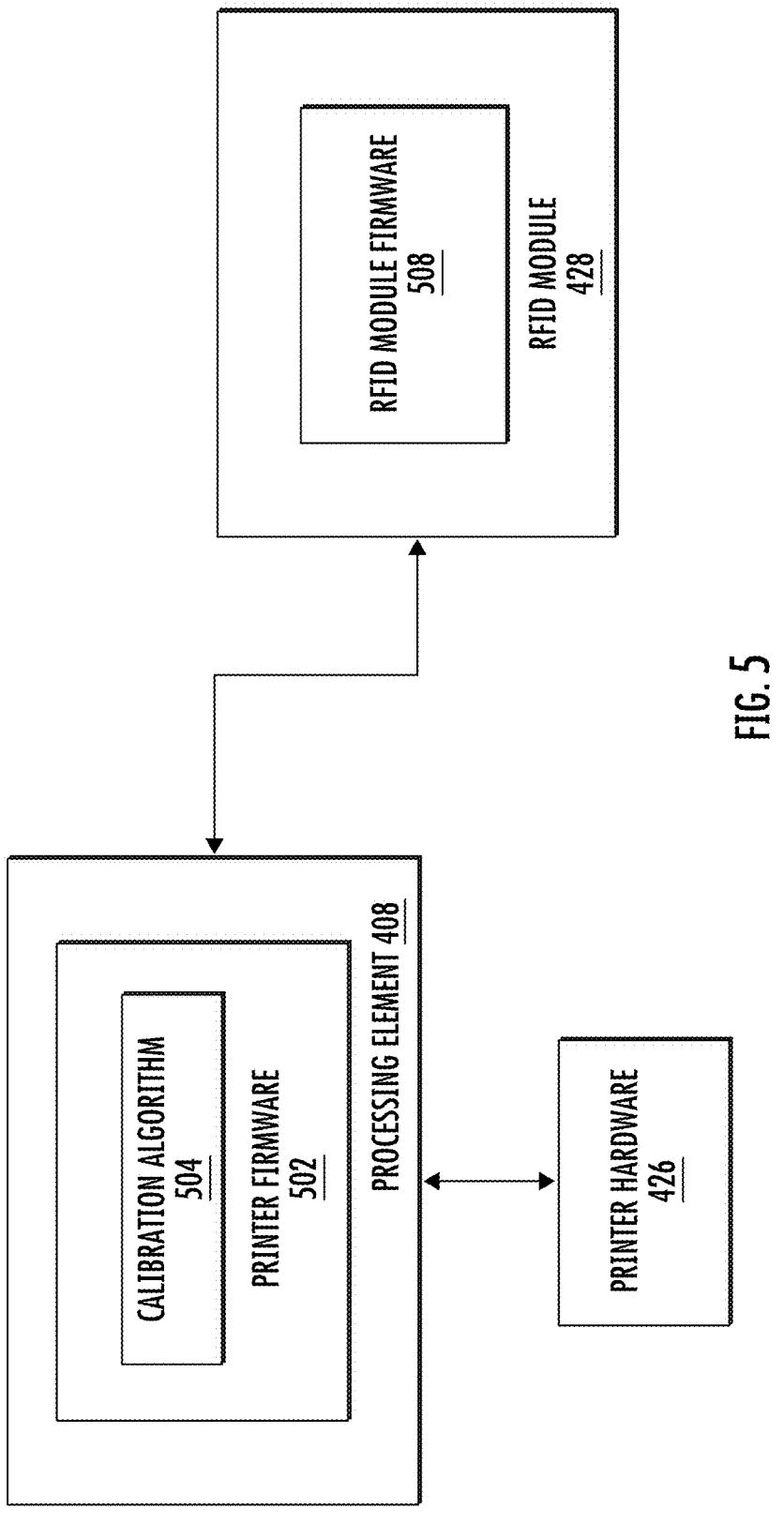
FIG. 5 illustrates an example firmware communication architecture in accordance with various embodiments of the present disclosure.

FIG. 5 depicts an example firmware communication architecture between printer hardware and an RFID module. As depicted in FIG. 5, processing element 408 is coupled to printer hardware 426. Processing element 408 may provide instructions for controlling operations of printer hardware 426 by executing printer firmware 502. Printer firmware 502 may comprise software instructions and/or logic for managing operation of the printer hardware 426. Printer firmware 502 further comprises calibration algorithm 504. Calibration algorithm 504 may comprise logic for determining and configuring printer hardware 426 with printer label media settings and RFID label media settings.

In some embodiments, printer label media settings may comprise configurations for label media type (e.g., gap, black mark, or continuous), printing method (e.g., ribbon or no-ribbon), or label media length. In some embodiments, RFID label media settings may comprise parameters for reading and encoding RFID label media. The calibration algorithm 504 may be performed to generate settings for a variety of label media types and saved to corresponding profiles. The settings generated by performing calibration algorithm 504 may configure the printer hardware 426 and RFID module 428 for optimal operation for each specific type of label media as well as determine optimal configurations for RFID reading and encoding in the presence of interference rich environments. Further details of calibration algorithm 504 are described in further detail with respect to the description of FIG. 6.

Processing element 408 may communicate with RFID module 428 to integrate RFID functionality provided by RFID module 428 with printing performed by printer hardware 426. In some embodiments, processing element 408 may communicate with RFID module 428 via interface commands over a universal asynchronous receiver/transmitter (UART) communication protocol. RFID module 428 comprises RFID module firmware 508. RFID module firmware may comprise software instructions and/or logic for managing reading and encoding operations performed by RFID module 428.

In some embodiments, processing element 408 may transmit instructions to RFID module 428 for encoding and verifying (e.g., reading and re-writing) RFID labels. RFID module 428 may receive the instructions from processing element 408 transmit RF signals based on the instructions via an RFID antenna. For example, an RFID label within the RF signal field of an RFID coupler of the RFID module 428 may receive a signal transmitted from the RFID module 428. If the signal is an encoding signal, the RFID label may be encoded with the signal. If the signal is a read signal (e.g., for verifying), the RFID label may generate a response RF signal comprising data recorded on the RFID label, which may be received by the RFID module 428 via the RFID coupler and verified. In some embodiments, the processing element 408 may also transmit instructions to RFID module 428 for performing self-calibration.

Figure 6:
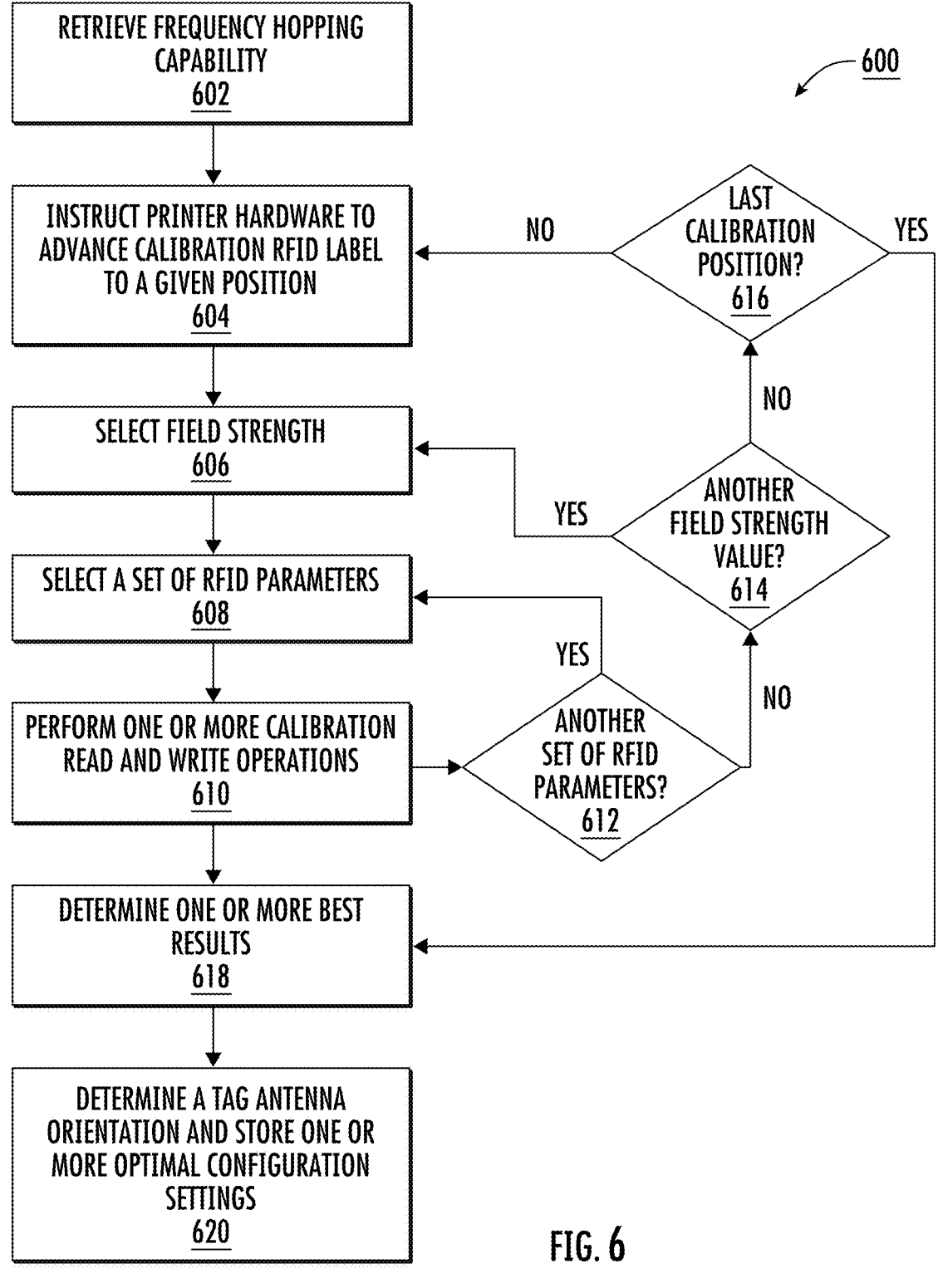
FIG. 6 illustrates a flowchart of an example method for calibration an RFID printer in accordance with various embodiments of the present disclosure.

FIG. 6 depicts an example flow diagram illustrating an exemplary method for calibration an RFID printer in accordance with some example embodiments of the present disclosure. It is noted that each block of a flowchart, and combinations of blocks in the flowchart, may be implemented by various means such as hardware, firmware, circuitry, and/or other devices associated with execution of software including one or more computer program instructions. For example, one or more of the steps/operations described in FIG. 6 may be embodied by computer program instructions, which may be stored by a non-transitory memory of an apparatus employing an embodiment of the present disclosure and executed by a processor component in an apparatus (such as, but not limited to, processing element 408). For example, these computer program instructions may direct the processor component to function in a particular manner, such that the instructions stored in the computer-readable storage memory produce an article of manufacture, the execution of which implements the function specified in the flowchart block(s).

In FIG. 6, the example method 600 may be executed by a computing device associated with a self-calibrating RFID printer (for example, as illustrated and described above in connection with at least FIG. 4). In some embodiments, at step 602, the computing device retrieves frequency hopping capability from an RFID module coupled to the RFID printer. The RFID module may comprise an RFID coupler or antenna, an RFID chip, and associated circuitry configured to perform RFID read and encode operations in conjunction with printing operations performed by the RFID printer. In some embodiments, the RFID module may or may not employ frequency hopping. In the course of transmitting RF signals to RFID labels, the RFID module may hop through one or more frequencies and/or channels based on established frequency hopping regulations. For example, frequency hopping may be performed by transmitting radio signals with a carrier signal that is switched rapidly among many frequency channels to prevent RF interference or reader collision when two RFID devices transmit the same frequency at the same time. In some embodiments, the frequency hopping capability is configured to comply with specific regulations of each country where used.

In some embodiments, at step 604, the computing device instructs printer hardware to advance a calibration RFID label to a given position. The given position may refer to a length, a distance from a boundary, or a dot position of the calibration RFID label. In some embodiments, the given position comprises a location on the calibration RFID label for which one or more calibration procedures are performed. In some embodiments, the given position may vary based on size of printhead of the RFID printer (e.g., 203 dpi or 406 dpi) and/or label length (e.g., 3 inch or 5 inch) of the calibration RFID label. In some embodiments, the given position may comprise an initial position, e.g., at the start of calibration, and in further iterations, the given position may comprise a predetermined increment the calibration RFID label may be advanced to up to a last calibration position.

The calibration RFID label may comprise, for example, a first or a selected one of a plurality RFID labels, such as from a roll of RFID label media, which is used for calibrating an RFID printer. The RFID printer may comprise printer hardware, such as a printhead, a media guide assembly, a platen roller and/or one or more media moving mechanisms, and sensors. In some embodiments, the given position the printer hardware advances the calibration RFID label to may be relative to an RFID coupler of the RFID module.

In some embodiments, at step 606, the computing device selects a first field strength of the RFID module. Field strength may comprise antenna gain used to transmit or receive RF signals by the RFID module. Selecting a field strength of the RFID module may comprise retrieving a minimum field strength value and a maximum field strength value from the RFID module and configuring the RFID module with a field strength within the minimum field strength value and the maximum field strength value. For example, the RFID module may be capable of operating with field strengths from 12 dB to 27 dB.

In some embodiments, at step 608, the computing device selects a first set of RFID parameters for the RFID module. The first set of RFID parameters may be associated with operation of the RFID module according to first RFID parameter settings. For example, the RFID module may operate according to a variety of RFID parameter settings. The RFID parameters may be based on the EPC radio-frequency identity protocols generation-2 (ultrahigh frequency) UHF RFID standard. In some embodiments, the RFID parameters comprise attributes that pertain to ISO 18000-6C UHF passive systems that adopt the EPCC1G2 (Gen2) standard.

In some embodiments, a set of RFID parameters comprises values for type A reference interval (TARI), backscatter-link frequency (BLF), and Miller.

TARI may comprise a time associated with a duration of a data-0 symbol. TARI may be used as a reference time interval for commands sent from an RFID reader to a RFID tag. The length of TARI can vary from 6.25 to 25 microseconds. A longer TARI value can improve immunity to interference and noise. By extending the duration of the reference time interval, the system becomes more tolerant to disruptions and variations in the RF environment, resulting in better overall reliability but at a cost of slower the data transfer rate.

BLF may comprise a rate at which the tag transmits its data by modulating the reflected signal. The BLF value may be expressed in hertz (Hz). BLF values in RFID systems may include 40 kHz to 33 KHZ. By adjusting the BLF, RFID systems can optimize the trade-off between communication range, data transfer speed, and interference tolerance. Higher BLF values may allow for faster data rates but may reduce the effective read range. Lower BLF values can extend the read range but may result in slower data transfer rates.

Miller may comprise a type of signal encoding used in RFID tags. Possible Miller modulation types include FM0, Miller-2, Miller-4, Miller-8, which may an influence on the duration of the modulation. As an example, choice of Miller encoding 4 is more resistant to noise and interference and it can also achieve a higher data rate.

In some embodiments, selecting the first set of RFID parameters further comprises retrieving one or more RFID parameter set identifiers from the RFID module, determining corresponding parameter values of the one or more RFID parameter set identifiers, and configuring the RFID module with parameters values associated with one of the one or more RFID parameter set identifiers. Each of the one or more RFID parameter set identifiers may comprise combinations of predefined parameter values that are unique to the RFID parameter set identifier. Furthermore, the one or more RFID parameter set identifiers retrieved from the RFID module may identify specific RFID parameter configurations that the RFID module may operate with. As such, the RFID module may provide the one or more RFID parameter set identifiers to identify specific values of RFID parameters that the RFID module may be configured with.

The following provides example RFID parameter values for a plurality of example RFID parameter set identifiers in accordance with EPCC1G2 standard systems:

Federal Communications Commission (FCC) Standard
   ID 9: BLF=40 KHz, MILLER=1, TARI=25;
   ID 12: BLF=160 KHz, MILLER=1, TARI-6;
   ID 16: BLF=242 KHz, MILLER=4, TARI=12;
   ID 18: BLF=309 KHz, MILLER=4, TARI=25;
   ID 25: BLF=333 KHz, MILLER=1, TARI=6;
   ID 28: BLF=307 KHz, MILLER=1, TARI=6.

European Telecommunications Standards Institute
   ID 18: BLF=309 KHz, MILLER=4, TARI=25;
   ID 21: BLF=160 KHz; MILLER=1, TARI=25;
   ID 27: BLF=242 KHz; MILLER=4, TARI=25.

In some embodiments, at step 610, the computing device performs one or more calibration read and write operations to the calibration RFID label at the given position with the RFID module based on the first field strength, the first set of RFID parameters, and the frequency hopping capability. Performing the calibration read and write operations may further comprise determining a result or status of the calibration read and write operations to the calibration RFID label at the given position and indexing the result or status with the first field strength and the first set of RFID parameters, e.g., in a table or data structure. Success or failure of the calibration read and write operations may provide an indication of a distance between the RFID coupler of the RFID module and a tag antenna of the calibration RFID label as well as an orientation of the tag antenna. In some embodiments, determining the result or status of the calibration read and write operations may further comprise determining a received signal strength indicator (RSSI) of RF communications between the RFID module and the calibration RFID label.

In some embodiments, at step 612, the computing device determines whether the RFID module can be configured with another set of RFID parameters, e.g., from one or more RFID parameter set identifiers retrieved from the RFID module, to perform additional one or more calibration read and write operations. If a second set of RFID parameters is available, the computing device selects the second set of RFID parameters at step 608, and at step 610, the computing device performs one or more calibration read and write operations to the calibration RFID label at the given position with the RFID module based on the first field strength, the second set of RFID parameters, and the frequency hopping capability. The computing device may iterate through and select a plurality of sets of RFID parameters and perform calibration read and write operations on the calibration RFID label with the RFID module using the plurality of sets of RFID parameter settings with the first field strength until calibration read and write operations has been performed on the calibration RFID label with every set of the plurality of sets of RFID parameters with the first field strength.

In some embodiments, if all the sets of RFID parameters for the RFID module have been exhausted, at step 614, the computing device determines whether another field strength value for the RFID module may be selected. If a second field strength is available, the computing device selects the second field strength at step 606, and the computing device may iteratively continue to select a plurality of sets of RFID parameters and perform calibration read and write operations on the calibration RFID label with the RFID module based on the plurality of sets of RFID parameters, the second field strength and the frequency hopping capability (steps 608, 610, and 612) until calibration read and write operations has been performed on the calibration RFID label with every set of the plurality of sets of RFID parameters with the second field strength. As such, via steps 612 and 614, the computing device determines a plurality of field strength values and a plurality of sets of RFID parameters by iterating through a variety of RFID parameters and field strength combinations and performs calibration read and write operations on the calibration RFID label based on the plurality of field strength values and the plurality of sets of RFID parameters.

In some embodiments, if all the field strength values chosen for the RFID module have been exhausted, at step 616, the computing device determines whether the calibration RFID label has been advanced to a last calibration position. If not, at step 604, the computing device instructs the printer hardware to advance the calibration RFID label to a next given position. For example, advancing the calibration RFID label to the next given position may comprise advancing the calibration RFID label by a predetermined increment.

The last calibration position may comprise a predetermined position on the calibration RFID label to terminate calibration read and write operations. In some embodiments, the last calibration position may comprise a location at half of the calibration RFID label under an assumption that the calibration RFID label is symmetrical, especially regarding tag antenna design pattern and/or placement of the tag antenna. In some embodiments, the last calibration position may comprise a location beyond half of the calibration RFID label and before the ending edge of the calibration RFID label such that calibration may be performed on a majority of the calibration RFID label under an assumption that the calibration RFID label is not symmetrical. However, by increasing the range of performing calibration on the calibration RFID label, a time taken to perform the calibration will also increase accordingly.

In some embodiments, if the calibration RFID label is at the last calibration position, at step 618, the computing device determines best one or more of a plurality of results associated with calibration read and write operations performed on the calibration RFID label by comparing results of the calibration read and write operations performed using the selected field strengths and sets of RFID parameters. As discussed above, the result or status of calibration read and write operations at given positions of the calibration RFID label may be stored and indexed with various combinations of field strengths and sets of RFID parameters in a table or data structure. Determining the best one or more results may comprise determining one or more given positions of the calibration RFID label exhibiting successful calibration read and write operations with most field strengths and most sets of RFID parameters. In some embodiments, determining the best one or more results may further comprise determining one or more given positions of the calibration RFID label associated with RSSI values that meet a certain threshold.

In some embodiments, at step 620, the computing device determines a tag antenna orientation of the calibration RFID label and stores one or more optimal configuration settings in printer firmware of the RFID printer. The tag antenna orientation may be determined based on the results of the one or more calibration read and write operations performed with the selected field strengths and sets of RFID parameters. For example, results of the one or more calibration read and write operations for a horizontally-oriented tag antenna may comprise consistent success of tag read/write (and consistent RSSI values) across a plurality of gain variations as the calibration RFID label is advanced closer to the RFID coupler of the RFID module, whereas results of the one or more calibration read and write operations for a vertically-oriented tag antenna may comprise inconsistent success of tag read/write (and inconsistent RSSI values) across a plurality of gain variations as the calibration RFID label is advanced closer to the RFID coupler.

Inconsistent success of tag read/write to an RFID label with a vertically-oriented tag antenna may be due to the design a tag antenna. That is, when a tag antenna is vertically oriented in relation to an RFID coupler, the tag antenna is tangent to the RF field signal of the RFID coupler, resulting in poor or inconsistent RFID communication quality between the tag antenna and the RFID coupler. Furthermore, when the tag antenna is vertically oriented in relation to a horizontally-oriented RFID coupler, a smaller portion or profile of the tag antenna faces the RFID coupler, and may increasing the chance of exposure to gaps of the tag antenna structure. Thus, to ensure optimal functionality with RFID labels with vertically-oriented tag antennas, the computing device stores one or more optimal configuration settings in printer firmware for use in the case of RFID labels with vertically-oriented tag antennas. The optimal configuration settings may comprise the best one or more results of the one or more calibration read and write operations.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A method of calibrating a radio frequency identification (RFID) printer, the method comprising:

retrieving, by a computing device, frequency hopping capability from an RFID module coupled to the RFID printer;

instructing, by the computing device, printer hardware to advance a calibration RFID label to a plurality of given positions;

selecting, by the computing device, one or more first field strengths;

selecting, by the computing device, one or more sets of RFID parameters;

performing, by the computing device, a plurality of calibration read and write operations to the calibration RFID label at the plurality of given positions using the RFID module based on a plurality of combinations comprising the one or more field strengths, the one or more sets of RFID parameters, and the frequency hopping capability;

determining, by the computing device, best one or more of a plurality of results associated with the plurality of calibration read and write operations;

determining, by the computing device, a tag antenna orientation of the calibration RFID label based on the plurality of results; and storing, by the computing device, one or more optimal configuration settings in printer firmware of the RFID printer based on the tag orientation and the best one or more of the plurality of results.

2. The method of claim 1, wherein the frequency hopping capability is associated with the RFID module hopping through one or more frequencies and/or channels.

3. The method of claim 1, wherein the plurality of given positions are based on at least one of a size of a printhead associated with the RFID printer or length of the calibration RFID label.

4. The method of claim 1, wherein the one or more first field strengths comprise one or more values of antenna gain used to transmit or receive radio frequency signals by the RFID module.

5. The method of claim 1, wherein selecting the one or more first field strengths further comprises:

retrieving a minimum field strength value and a maximum field strength value from the RFID module; and configuring the RFID module with a field strength within the minimum field strength value and the maximum field strength value.

6. The method of claim 1, wherein the one or more sets of RFID parameters comprise values associated with type A reference interval (TARI), backscatter-link frequency (BLF), and Miller.

7. The method of claim 1, further comprising:

determining the plurality of results associated with the plurality of calibration read and write operations; and indexing the plurality of results with the one or more field strengths and the one or more sets of RFID parameters.

8. The method of claim 1, wherein the plurality of results comprises received signal strength indicator values.

9. The method of claim 1, wherein the plurality of results comprises success or failure of the plurality of calibration read and write operations.

10. The method of claim 1, wherein determining the best one or more of the plurality of results further comprises:

determining one or more of the plurality of given positions that exhibit successful calibration read and write operations with a most amount of the one or more field strengths and the one or more sets of RFID parameters.

11. The method of claim 1, wherein determining the best one or more of the plurality of results further comprises:

determining that the plurality of given positions are associated with RSSI values that meet a threshold.

12. A computing apparatus comprising memory and one or more processors communicatively coupled to the memory, the one or more processors configured to:

retrieve frequency hopping capability from a radio frequency identification (RFID) module coupled to an RFID printer;

instruct printer hardware to advance a calibration RFID label to a plurality of given positions;

select one or more first field strengths;

select one or more sets of RFID parameters;

perform a plurality of calibration read and write operations to the calibration RFID label at the plurality of given positions using the RFID module based on a plurality of combinations comprising the one or more field strengths, the one or more sets of RFID parameters, and the frequency hopping capability;

determine best one or more of a plurality of results associated with the plurality of calibration read and write operations;

determine a tag antenna orientation of the calibration RFID label based on the plurality of results; and store one or more optimal configuration settings in printer firmware of the RFID printer based on the tag orientation and the best one or more of the plurality of results.

13. The computing apparatus of claim 12, wherein the one or more processors are further configured to:

retrieve a minimum field strength value and a maximum field strength value from the RFID module; and configure the RFID module with a field strength within the minimum field strength value and the maximum field strength value.

14. The computing apparatus of claim 12, wherein the one or more sets of RFID parameters comprise values associated with type A reference interval (TARI), backscatter-link frequency (BLF), and Miller.

15. The computing apparatus of claim 12, wherein the one or more processors are further configured to:

determine the plurality of results associated with the plurality of calibration read and write operations; and index the plurality of results with the one or more field strengths and the one or more sets of RFID parameters.

16. The computing apparatus of claim 12, wherein the plurality of results comprises received signal strength indicator values.

17. The computing apparatus of claim 12, wherein the plurality of results comprises success or failure of the plurality of calibration read and write operations.

18. The computing apparatus of claim 12, wherein the one or more processors are further configured to:

determine one or more of the plurality of given positions that exhibit successful calibration read and write operations with a most amount of the one or more field strengths and the one or more sets of RFID parameters.

19. The computing apparatus of claim 12, wherein the one or more processors are further configured to:

determine that the plurality of given positions are associated with RSSI values that meet a threshold.

20. One or more non-transitory computer-readable storage media including instructions that, when executed by one or more processors, cause the one or more processors to:

retrieve frequency hopping capability from a radio frequency identification (RFID) module coupled to an RFID printer;

instruct printer hardware to advance a calibration RFID label to a plurality of given positions;

select one or more first field strengths;

select one or more sets of RFID parameters;

perform a plurality of calibration read and write operations to the calibration RFID label at the plurality of given positions using the RFID module based on a plurality of combinations comprising the one or more field strengths, the one or more sets of RFID parameters, and the frequency hopping capability;

determine best one or more of a plurality of results associated with the plurality of calibration read and write operations;

determine a tag antenna orientation of the calibration RFID label based on the plurality of results; and store one or more optimal configuration settings in printer firmware of the RFID printer based on the tag orientation and the best one or more of the plurality of results.

* * * * *